S. B. McHENRY.
ASTRONOMICAL DEMONSTRATING DEVICE.
APPLICATION FILED JUNE 23, 1917.
1,293,837.
Patented Feb. 11, 1919.
2 SHEETS—SHEET 1.
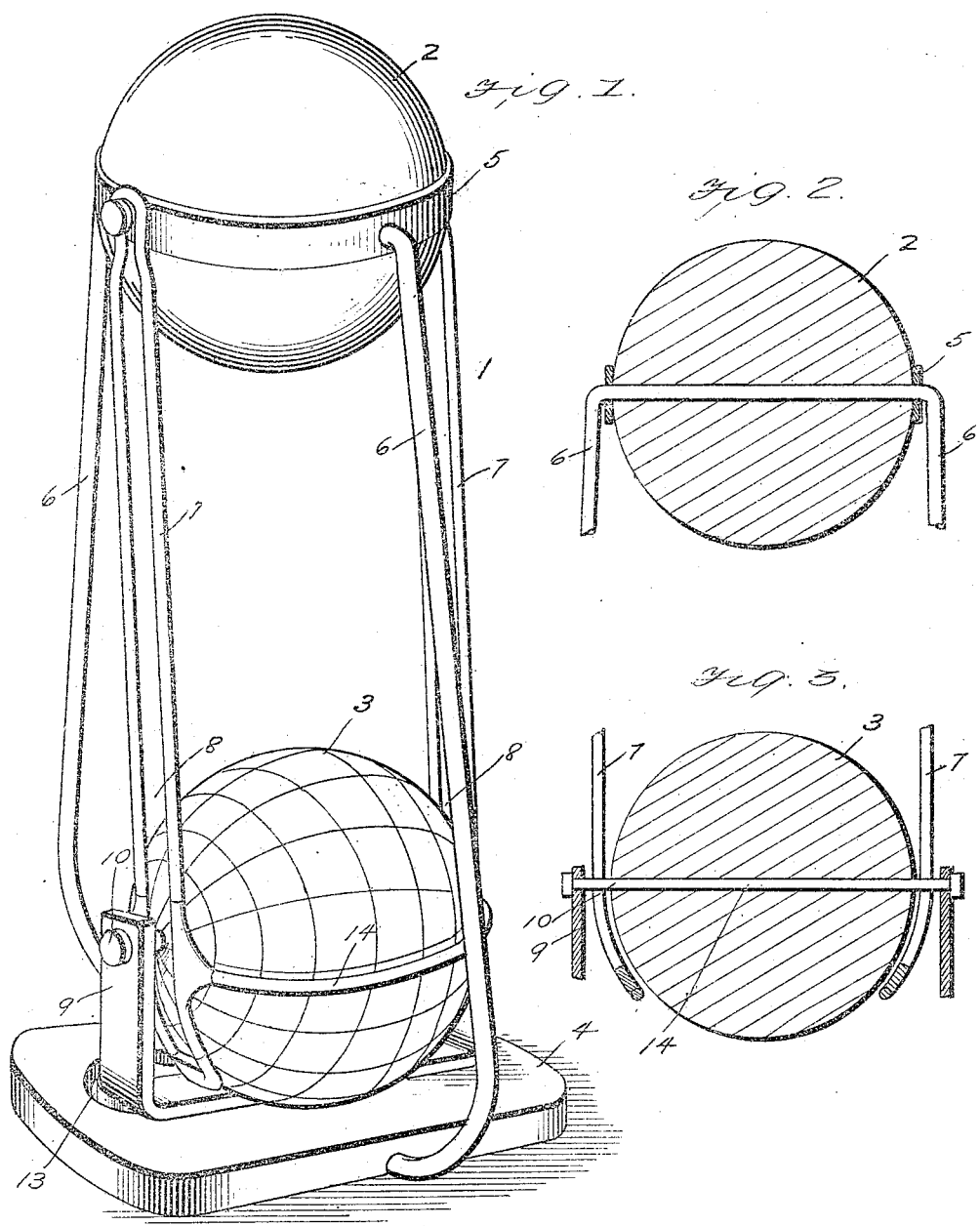

S. B. McHENRY.
ASTRONOMICAL DEMONSTRATING DEVICE.
APPLICATION FILED JUNE 23, 1917.
1,293,837.
Patented Feb. 11, 1919.
2 SHEETS—SHEET 2.
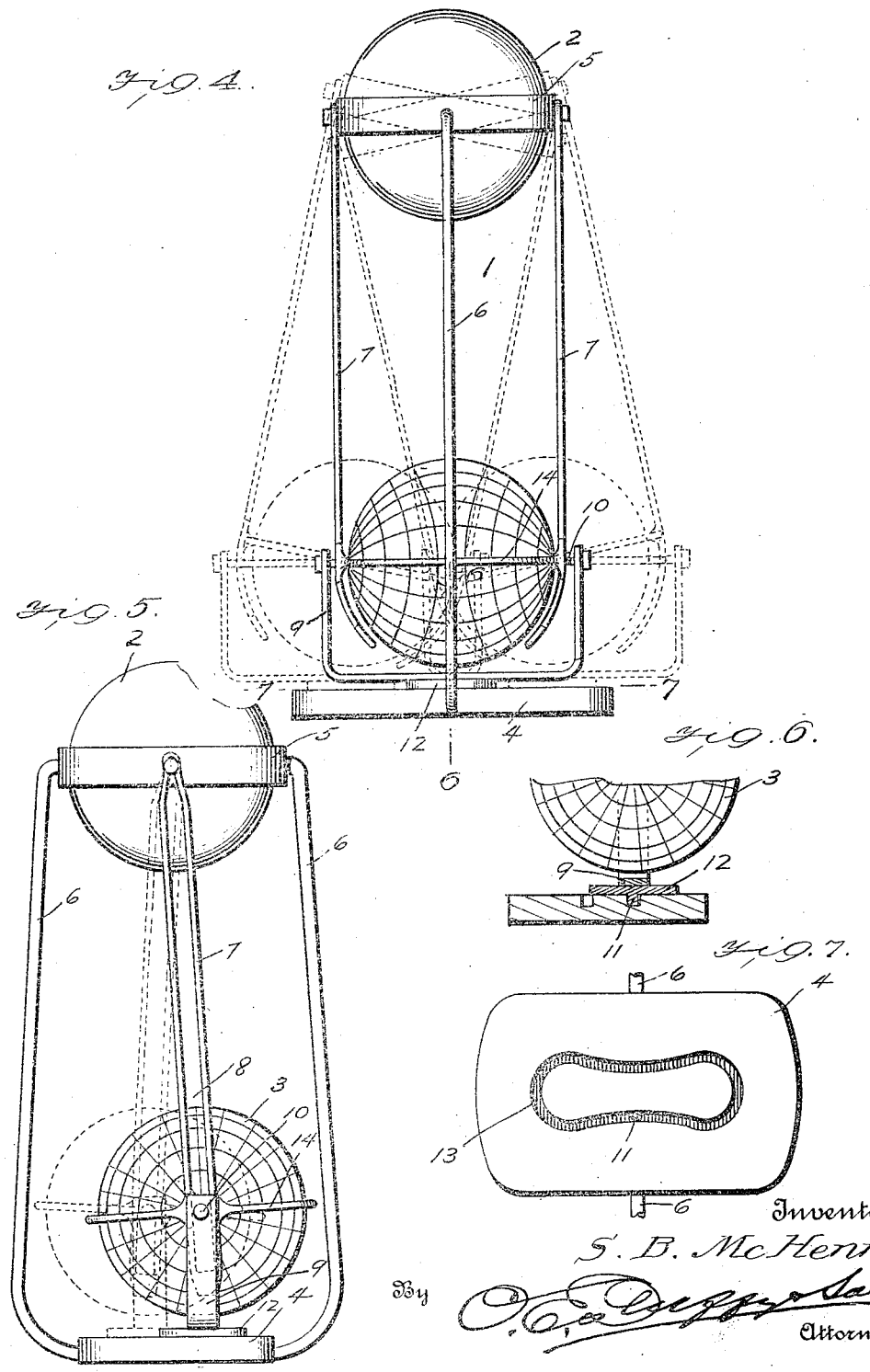

UNITED STATES PATENT OFFICE.

SAMUEL B. McHENRY, OF BLOOMSBURG, PENNSYLVANIA.

ASTRONOMICAL DEMONSTRATING DEVICE.

1,293,837.

Specification of Letters Patent.

Patented Feb. 11, 1919.

Application filed June 23, 1917. Serial No. 176,511.

*To all whom it may concern:*

Be it known that I, SAMUEL B. McHENRY, a citizen of the United States, residing at Bloomsburg, in the county of Columbia and State of Pennsylvania, have invented certain new and useful Improvements in Astronomical Demonstrating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an astronomical demonstrating device, and has for its object to embody certain improvements over my prior U. S. Patent No. 1134473, patented April 6, 1915.

In the astronomical demonstrating device embraced in said prior patent, the element representing the earth was caused to move in a straight line under the element representing the sun, and while said device was helpful in demonstrating the manner in which the earth took its light from the sun, said device did not embody any arrangement for providing a swing of the element representing the earth in an orbit, and this present invention consists principally in providing means for allowing the element representing the earth to swing in an orbit so that a more perfect demonstration can thereby be provided.

Referring to the accompanying drawings—

Figure 1 is a perspective view of an astronomical demonstrating device constructed in accordance with this invention.

Fig. 2 is a vertical sectional view through the element representing the sun and illustrating the manner of mounting the same.

Fig. 3 is a vertical sectional view through the element representing the earth and illustrating the manner of mounting the same.

Fig. 4 is a side elevation illustrating the extreme positions of the element representing the earth.

Fig. 5 is an end elevation illustrating the extreme positions of the element representing the earth.

Fig. 6 is a fragmentary view partly in section and partly in elevation taken on line 6—6 of Fig. 4, and Fig. 7 is a plan view of the base of the device illustrating the orbit through which the element representing the earth is caused to swing.

Like numerals of reference indicate the same parts throughout the several figures, in which—

1 indicates the astronomical demonstrating device which includes the spherical element 2 representing the sun, the spherical element 3 representing the earth and the base 4, which acts as a base of support for the device, and which forms the guiding element for the spherical element 3 in its swing around its orbit.

The spherical element 2 representing the sun is provided with a band 5 about its horizontal equatorial line and passing through said band and into the sphere 2 at diametrically opposite points are the two standards 6 which form the support for the sphere 2, said standards 6 being suitably secured at their lower ends to the base 4 in the manner as shown in the accompanying drawings. Secured to the equatorial band 5 at diametrically opposite points and intermediate of the points of attachment of the standards 6 are the tangential bars 7, which as will appear from Fig. 1 are bifurcated so as to provide a slot 8 in each of the bars 7. 9 indicates a movable substantially U-shaped support within which the sphere 3 representing the earth is horizontally and rotatably mounted on a horizontal shaft 10, the said shaft 10 passing through the slotted openings 8 in each of the bars 7.

Referring now to Figs. 6 and 7 it will be seen that the U-shaped support 9 is provided with a depending spur or boss 11 and a flattened base 12 so as to rest evenly upon the supporting base 4 of the device, the said base 4 of the device being provided as shown in Fig. 7 with a groove 13 of the shape substantially as shown in Fig. 7 within which groove 13 the depending boss 11 operates and in which the said boss 11 is guided.

Having thus fully described the invention, its operation is as follows:

From Fig. 4 it will be seen that when the sphere 3 representing the earth is in position shown in full lines in said figure, the ring or band 14 which connects the bars 7, is exactly parallel with the sphere supporting shaft 10, thus said ring or band 14 is exactly at the equatorial line of the sphere 3, while the vertical tangential bars 7 indicate exactly the direction in which the light from the sun reaches the earth and demonstrates the fact that both poles of the sphere 3 are receiving light from the sphere 2 indicating the sun. As the sphere 3 is moved to the right or to the left, the same being guided by the slotted base 4, the tangential bars 7 swing as does also the equatorial ring or band 14, while the poles of the sphere 3 remain in a horizontal position on the shaft 10. Thus as will be seen from Fig. 4 one pole of the sphere 2 is in darkness at one end of the swing, while the opposite pole of the sphere 3 is in darkness at the other end of the swing, the light line on the earth being indicated by the equatorial ring or band 14 as shown in dotted lines in the two positions in Fig. 4.

Referring now to Fig. 5 it will be seen that as the sphere 3 swings around the ends of the slot 13, said sphere passes from position shown in full lines in Fig. 5 to position shown in dotted lines in Fig. 5, thus also altering the position of the equatorial ring or band 14 as is indicated in the said figure. By this means the direction of the light passing from the sun to the earth is altered.

From the foregoing description taken in connection with the accompanaying drawings, it will be seen that the sphere 3 representing the earth can be slowly moved around its orbit as indicated by the slot 13 in Fig. 7 so that the equatorial ring or band 14, as well as the tangential bars 7 gradually changes from one position to another to demonstrate the manner in which the earth takes its light from the sun.

Having thus fully described the invention, what I claim as new and desire to secure by Letters Patent of the United States, is—

1. In a device of the character described, a partially revoluble element arranged to represent the sun, a suitable frame-work to which the said element is pivoted, a base provided with an endless groove, a support having connection with said endless groove, a horizontally arranged shaft in said support, an element rotatable on said horizontally arranged shaft, said element representing the earth, a ring encompassing said element representing the earth and disposed in line with the poles of the element representing the earth when said element is directly under the said element representing the sun, tangentially arranged bars connecting said two elements representing the sun and the earth, the said ring being mounted on said tangential bars, so that the position of said ring is altered with relation to the poles of the element representing the earth when said tangential bars and said element representing the earth are moved in the direction of the said endless groove in the said base substantially as described and for the purposes set forth.

2. A device of the character described comprising a sphere representing the sun, a sphere representing the earth, a suitable frame upon which the sphere representing the sun is mounted, a base, a support resting on said base, said base being provided with means for guiding the said support in an orbit, a shaft upon which the element representing the earth is pivoted, tangential bars connecting the element representing the earth to the element representing the sun, a ring carried by the said tangential bars, said ring crossing the poles of the element representing the earth when the element representing the earth is directly under the element representing the sun, the whole arranged in such manner that the said element representing the sun can be moved on the said base in an orbit to alter the position of the said ring with respect to the poles of the element representing the earth substantially as described.

3. A device of the character described, comprising an element representing the sun, an element representing the earth, a base, a support for the element representing the sun, said support including means for mounting the element representing the earth on a horizontal axis, the said base being provided with means for guiding the said support in an orbit and a ring encompassing the element representing the earth and disposed in relation thereto so that the said ring will cross the poles of the element representing the earth when the said element representing the earth is directly under the element representing the sun, the whole arranged in such manner that the said element representing the earth can be moved over the base in an orbit to alter the position of the said ring with respect to the poles of the element representing the earth, substantially as described.

In testimony whereof, I affix my signature, in presence of two witnesses.

SAMUEL B. McHENRY.

Witnesses:
R. S. HEMINGWAY,
ADELAIDE L. FERRIS.